United States Patent [19]

Ross et al.

[11] 3,763,318

[45] Oct. 2, 1973

[54] TIME DIVISION MULTIPLEXER-DEMULTIPLEXER FOR DIGITAL TRANSMISSION AT GIGAHERTZ RATES

[75] Inventors: Gerald F. Ross, Lexington; Leon Susman, Sudbury; Ellis E. Eves, II, Nabnasset, all of Mass.

[73] Assignee: Sperry Rand Corporation, New York, N.Y.

[22] Filed: Dec. 22, 1971

[21] Appl. No.: 210,976

[52] U.S. Cl. .......................... 179/15 A, 179/15 AN

[51] Int. Cl. .......................... H04j 3/04

[58] Field of Search .......................... 179/15 A, 15 BS, 179/15 AL, 15 AN

[56] References Cited

UNITED STATES PATENTS

| | | | |
|---|---|---|---|
| 3,571,516 | 3/1971 | Ohyama | 179/15 BS |
| 3,602,647 | 8/1971 | Kawashima | 179/15 BS |
| 2,680,151 | 6/1954 | Boothroyd | 179/15 A |

OTHER PUBLICATIONS

AIEE Technical Paper "A Time Division Multiplexing System" by Boothroyd et al., Dec. 1948

*Primary Examiner*—Kathleen H. Claffy
*Assistant Examiner*—Thomas D'Amico
*Attorney*—Howard P. Terry

[57] ABSTRACT

The invention is a time division multiplexing-demultiplexing system for converting the parallel digits of a data word into serial format, transmitting the serial digits on a transmission line and reconstituting the parallel data word from the serially transmitted digits thereof. The multiplexing portion of the system comprises a sequence of coincidence gates adapted to receive the parallel digits, respectively, of the data word to be transmitted. The gates are coupled to equally spaced points along a transmission line such that a coincidence pulse traveling along the line sequentially causes the gates to provide output pulses in accordance with the values of the digits applied thereto respectively. The outputs of the gates are applied to equally spaced points along another transmission line.

The demultiplexing portion of the system comprises another sequence of coincidence gates each having two inputs connected to the other ends of the two transmission lines, respectively, the inputs of the respective gates being connected at equally spaced points along the two lines. Each demultiplexing gate has an output that provides a pulse upon time coincidence of pulses at its inputs.

The coincidence pulse traveling along the one transmission line sequentially triggers the multiplexing gates to provide a serial digit stream on the other transmission line corresponding to the digits of the word to be transmitted. The coincidence pulse traveling in one direction along the one transmission line sequentially triggers the demultiplexing gate in time coincidence with the serial digit stream traveling in the opposite direction along the other transmission line to provide the digits, in parallel, at the outputs of the demultiplexing gates, respectively.

9 Claims, 6 Drawing Figures

United States Patent [19] [11] 3,763,318
Ross et al. [45] Oct. 2, 1973
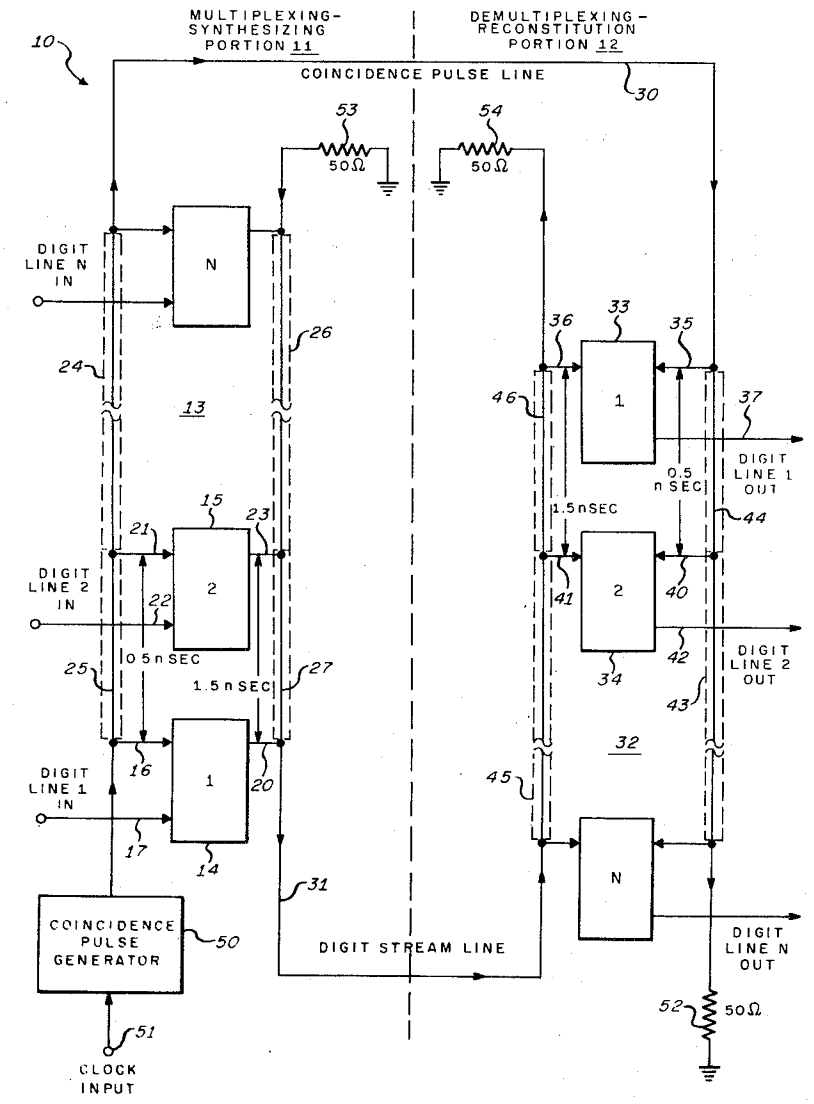

TIME DIVISION MULTIPLEXER-DEMULTIPLEXER FOR DIGITAL TRANSMISSION AT GIGAHERTZ RATES

BACKGROUND OF THE INVENTION

1. Field of the Invention

The invention relates to time division multiplexing-demultiplexing digital data transmission systems particularly for operation at gigahertz digit rates.

2. Description of the Prior Art

Time division multiplexing-demultiplexing systems are known in the art that operate at kilohertz and megahertz digit rates. Such systems normally utilize conventional shift register parallel to serial to parallel conversion configurations. In such systems in order to perform the required gating functions, it is often necessary to simultaneously apply a pulse to a plurality of gates at kilohertz and even megahertz rates. Such a function may be instrumented by connecting all of the gates to a common conductor to which the pulse is applied. At gigahertz rates, however, such a scheme cannot be utilized because propagation delays along the line cause timing anomolies that disrupt the proper operation of the device. In such systems for operation at gigahertz rates, corporate pulse distribution systems are often utilized comprising equal lengths of transmission lines or transmission line "tree" networks of T-junctions connecting the pulse source to the plurality of gates for the simultaneous application of the pulse thereto. Such systems are, of course, bulky and hence expensive since design parameters dictate the permissable line lengths and often gives rise to difficult impedance matching problems.

Time division multiplexing-demultiplexing systems for operation at gigahertz digit rates are known in the prior art wherein, in the demultiplexing portion, timing and data pulses travel in opposite directions along the same transmission line to which gates are connected at equally spaced intervals. In such systems, somewhat long delays must be utilized between the gates connected to the line so as to prevent pulse overlap. Also, the pulses traveling in opposite directions on the line often interfere with one another thus providing faulty operation of the system.

SUMMARY OF THE INVENTION

The invention provides a time division multiplexing-demultiplexing system for converting parallel digital data words occurring at megahertz rates into a serial digit stream at gigahertz rates; transmitting the digit stream along transmission line and reconverting the transmitted digit stream back into the original parallel digital data words. The multiplexing portion of the system comprises a plurality of first gates each having first and second inputs and an output for providing a pulse at the output thereof upon time coincidence of a pulse at the first input and a predetermined value at the second input. A serially connected sequence of first delay elements couple the first inputs of adjacent first gates to each other, respectively, the second inputs of the first gates being adapted to receive the digit of the data words, respectively, to be transmitted. A serially connected sequence of second delay elements couple the outputs of adjacent first gates to each other, respectively.

The demultiplexing portion of the system comprises a plurality of second gates each having third and fourth inputs and an output for providing a pulse at the output thereof upon time coincidence of pulses at the third and fourth inputs, respectively. A serially connected sequence of third delay elements couple the third inputs of adjacent second gates to each other respectively, and a serially connected sequence of fourth delay elements couple the fourth inputs of adjacent second gates to each other, respectively. A source of coincidence pulses coupled to one end of the sequence of first delay elements applies a coincidence pulse thereto in time coincidence with the data words respectively.

The multiplexing and demultiplexing portions of the system are coupled to each other by transmission means. In the preferred embodiment of the invention the transmission means comprises a first transmission line coupling the other end of the sequence of first delay elements to the sequence of third delay elements and a second transmission line coupling the sequence of second delay elements to the sequence of fourth delay elements.

In the preferred embodiment the coincidence pulse sequentially traveling along the sequence of first delay elements, the first transmission line and the sequence of third delay elements causes pulses representative of digits of the data words applied respectively to the first inputs of the first gates to be serially applied via the second transmission line to the sequence of fourth delay elements wherein time coincidence with the coincidence pulse provides the digits of the data words at the outputs of the second gates, respectively.

DESCRIPTION OF THE PREFERRED EMBODIMENT

Figure 1:
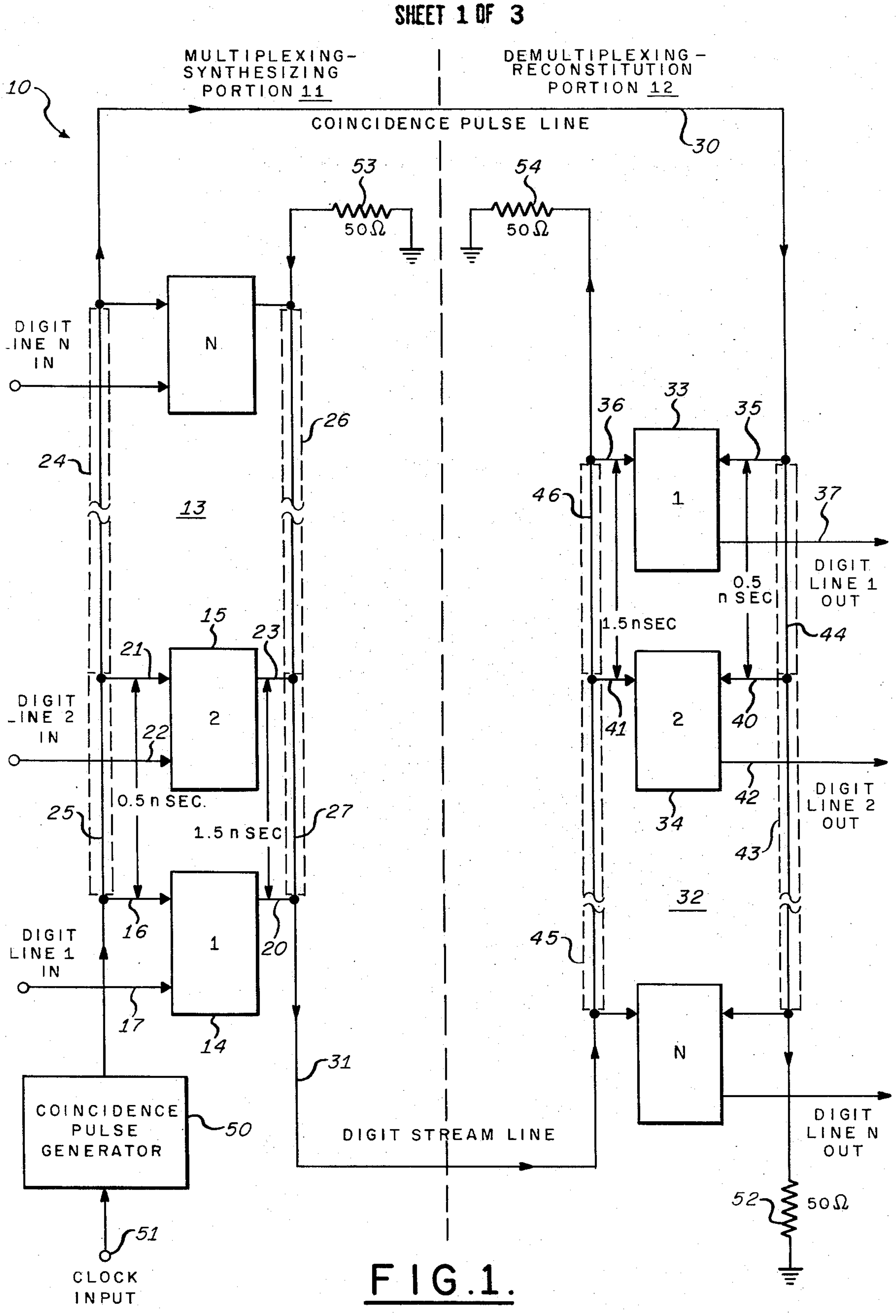
FIG. 1 is a schematic block diagram of a multiplexing-demultiplexing system arranged in accordance with the concepts of the present invention.

Referring to FIG. 1, a multiplexing-demultiplexing system 10 arranged in accordance with the present invention is illustrated. The system 10 is comprised of a multiplexing or synthesizing portion 11 and a demultiplexing or reconstitution portion 12. The synthesizing portion 11 is comprised of a sequence of synthesizing gates 13, two adjacent typical gates thereof being indicated at 14 and 15. The gates 13 are identical with respect to each other, a typical gate having first and second inputs and an output. For example, the first and second inputs and the output of the gate 14 are indicated at 16, 17, and 20, respectively, while the first and second inputs and the output of the gate 15 are indicated at 21, 22 and 23, respectively. Each of the gates 13 provides a pulse at its output upon time coincidence of a pulse at its first input and a signal representative of a predetermined value of a digit of the data word to be transmitted at its second input. For example, when a pulse appears at the input 16 coincident with the input 17 having a binary ZERO applied thereto, a pulse appears at the output 20. When, however, a binary ONE is applied to the input 17, no pulse appears on the output 20 irrespective of the presence of a pulse on the input 16.

The first inputs of adjacent gates 13 are coupled to each other, respectively, by a serially connected sequence of delay elements 24. For example, the input 16 of the gate 14 is coupled to the input 21 of the gate 15 via a delay element 25. Each of the sequence of delay elements 24 may be instrumented by a length of non-dispersive transmission line operating in the TEM mode which in the present embodiment of the invention preferably comprises a strip microwave transmission line. The length of transmission line chosen for the preferred embodiment of the invention is such as to effect a propagation delay of 0.5 nanoseconds between the inputs 16 and 21 of the gates 14 and 15, respectively, and similarly for the remaining of the gates 13. Each of the second inputs of the gates 13 is adapted to receive the corresponding digit of the data words to be transmitted. For example, the inputs 17 and 22 of the gates 14 and 15 are adapted to receive the first and second digit inputs respectively of the data words.

The outputs of adjacent gates 13 are coupled to each other, respectively, by a serially connected sequence of delay elements 26. For example, the output 20 of the gate 14 is coupled to the output 23 of the gate 15 via a delay element 27. The sequence of delay elements 26 may, for example, comprise strip microwave transmission lines similar to that described with respect to the sequence of delay elements 24. Each of the lengths of transmission lines of the sequence of elements 26 may be chosen, for example, to provide a propagation delay of 1.5 nanoseconds. For example, the transmission line 27 is chosen to provide a propagation delay of 1.5 nanoseconds between the outputs 20 and 23 of the gates 14 and 15, respectively. It will be appreciated that the delay values of 0.5 nanoseconds and 1.5 nanoseconds associated with the delay elements 25 and 27 are exemplary, other values of delay being possible in practicing the invention. It will be understood, however, that the delay values chosen for the segments of the line 24 should differ from the delay values chosen for the segments of the line 26 for reasons to be discussed.

The multiplexing portion 11 of the system is coupled to the demultiplexing portion 12 via transmission means comprising, for example, a coincidence pulse line 30 and a digit stream line 31. The lines 30 and 31 are non-dispersive microwave transmission lines operating in the TEM mode and, in the preferred embodiment of the invention, are preferably instrumented as flexible microwave transmission lines. One end of the transmission line 30 is connected to an end of the sequence of delay elements 24 and one end of the transmission line 31 is connected to an end of the sequence of delay elements 26 for transmitting the coincidence timing pulses and the stream of digit pulses, respectively, to the demultiplexing portion 12 of the system in a manner to be explained.

The demultiplexing portion 12 of the system comprises a sequence of reconstitution gates 32. Each of the gates 32 includes two inputs and an output, the two inputs being designated as third and fourth inputs to conveniently distinguish them from the two inputs of the gates 13. For example, two adjacent gates of the gates 32 are indicated at 33 and 34. The third and fourth inputs and the output of the gate 33 are indicated at 35, 36 and 37, respectively, and similarly the third and fourth inputs and the output of the gate 34 are indicated at 40, 41 and 42, respectively.

Each of the gates 32 provides a signal on its output representative of a binary ZERO whenever pulses are in time coincidence at its inputs, respectively. When pulses are not in time coincidence at its inputs, the output thereof provides a binary ONE signal.

The third inputs of adjacent gates 32 are coupled to each other, respectively, by a serially connected sequence of delay elements 43. For example, the inputs 35 and 40 of the gates 33 and 34, respectively, are coupled to each other via a delay element 44. The third inputs of the remaining gates 32 are similarly coupled together by the delay elements of the sequence of elements 43.

In a similar manner, the fourth inputs of the gates 32 are coupled together by a serially connected sequence of delay elements 45. For example, the inputs 36 and 41 of the gates 33 and 34, respectively, are coupled together by a delay element 46. The delay elements 43 and 45 may be of the same type previously discussed with respect to the delay elements 24. For example, the elements may preferably be instrumented by non-dispersive strip microwave transmission lines operating in the TEM mode. The lengths of transmission lines of the elements 43 may, for example, be chosen to effect a propagation delay of 0.5 nanoseconds between adjacent third inputs of the gates 32 and the lengths of the transmission lines 45 may be chosen, for example, to effect a propagation delay of 1.5 nanoseconds between adjacent fourth inputs of the gates 32. In a manner similar to that described with respect to the multiplexing portion 11, the delay values are arbitrary but must, of course, be chosen commensurate with those selected for the delay elements 24 and 26, respectively. The ends of the sequences of delay elements 43 and 45 are connected in series with the transmission lines 30 and 31, respectively.

The multiplexing-demultiplexing system 10 also includes a coincidence pulse generator 50. The generator 50 comprises a conventional avalanche transistor pulse generator for providing narrow pulses, e.g. 1 nanosecond wide, in response to a clock pulse signal at a terminal 51. The clock signal applied to the terminal 51 is such that the generator 50 provides its pulses at the data rate of the input words and synchronously therewith. The output of the coincidence pulse generator 50 is applied to one end of the sequence of delay elements 24.

The serially connected sequence of delay elements 24, the coincidence pulse line 30 and the sequence of delay elements 43 form a transmission line with an input port connected to the coincidence pulse generator 50, a group of output ports connected to the inputs of the gates 13 and a group of output ports connected to the inputs of the gates 32. This transmission line is terminated to ground through a resistor 52. The value of the resistor 52 is chosen to match the characteristic impedance of the line such that pulses traveling along the line are not reflected from the termination.

In a similar manner, the serially connected sequence of delay elements 26, the digit stream line 31 and the sequence of delay elements 45 form a transmission line with a group of input ports connected to the outputs of the gates 13 and a group of output ports connected to the inputs of the gates 32. The two ends of the line are terminated to ground through resistors 53 and 54, respectively. The values of the resistors 53 and 54 are chosen to match the characteristic impedance of the line such that reflections from the terminations do not occur.

The lengths of the transmission lines 30 and 31 must be chosen such that the propagation time for a coincidence pulse from the input of a particular gate in the multiplexing portion 11 to the input of the corresponding gate in the demultiplexing portion 12 is the same as the propagation time for the output pulse from that particular multiplexing gate resulting from the coincidence pulse to the input of the corresponding demultiplexing gate. In the embodiment of the invention illustrated in FIG. 1, the coincidence pulse line 30 must be N nanoseconds longer than the digit stream line 31 where N is the number of gates in the sequences of gates 13 and 32.

In operation, the N digits of the data word to be transmitted are applied in parallel to the inputs of the respective N gates of the sequence of gates 13. For example, the input digit lines 1 and 2 apply their bits to the inputs 17 and 22 of the gates 14 and 15, respectively. At a data word rate of, for example, one megahertz, the digit values persist on the input lines to the gates 13 for approximately 1 microsecond. Synchronously with the application of the digit signals to the inputs of the gates 13, the coincidence pulse generator 50 applies a one nanosecond wide pulse to the sequence of delay elements 24. The coincidence pulse from the generator 50 traveling along the length of transmission line 25, arrives at the input 21 of the gate 15 at 0.5 nanoseconds after it arrived at the input 16 of the gate 14. As the pulse continues to travel down the line 24, it arrives at each of the gates 13 at 0.5 nanoseconds after it arrived at the subsequent gate.

When the coincidence pulse arrives at the input of one of the gates 13, a narrow pulse is applied to the gate output if the associated input digit is a binary ZERO and no pulse is produced at the gate output if the input digit is a binary ONE. The output pulses produced by the gates 13 are approximately 1 nanosecond wide. These output pulses are coupled to the digit stream line and travel in both directions therealong. The pulses traveling in the direction opposite the arrows are dissipated in the termination resistor 53. Pulses from adjacent gates 13 traveling along the digit stream line in the direction of the arrows, are separated in time from each other by two nanoseconds which is the cumulative result of the lengths of 1.5 nanosecond transmission lines separating the outputs of the gates 13 and the lengths of 0.5 nanoseconds transmission lines separating the inputs of the gates 13. Thus it is appreciated that the coincidence pulse traveling along the sequence of delay elements 24 converts the parallel digits of the data words to be transmitted, the words occurring at a data word rate on the order of megahertz, to a serial digit stream at a digit rate on the order of gigahertz.

Figures 2A, 2B, 2C:
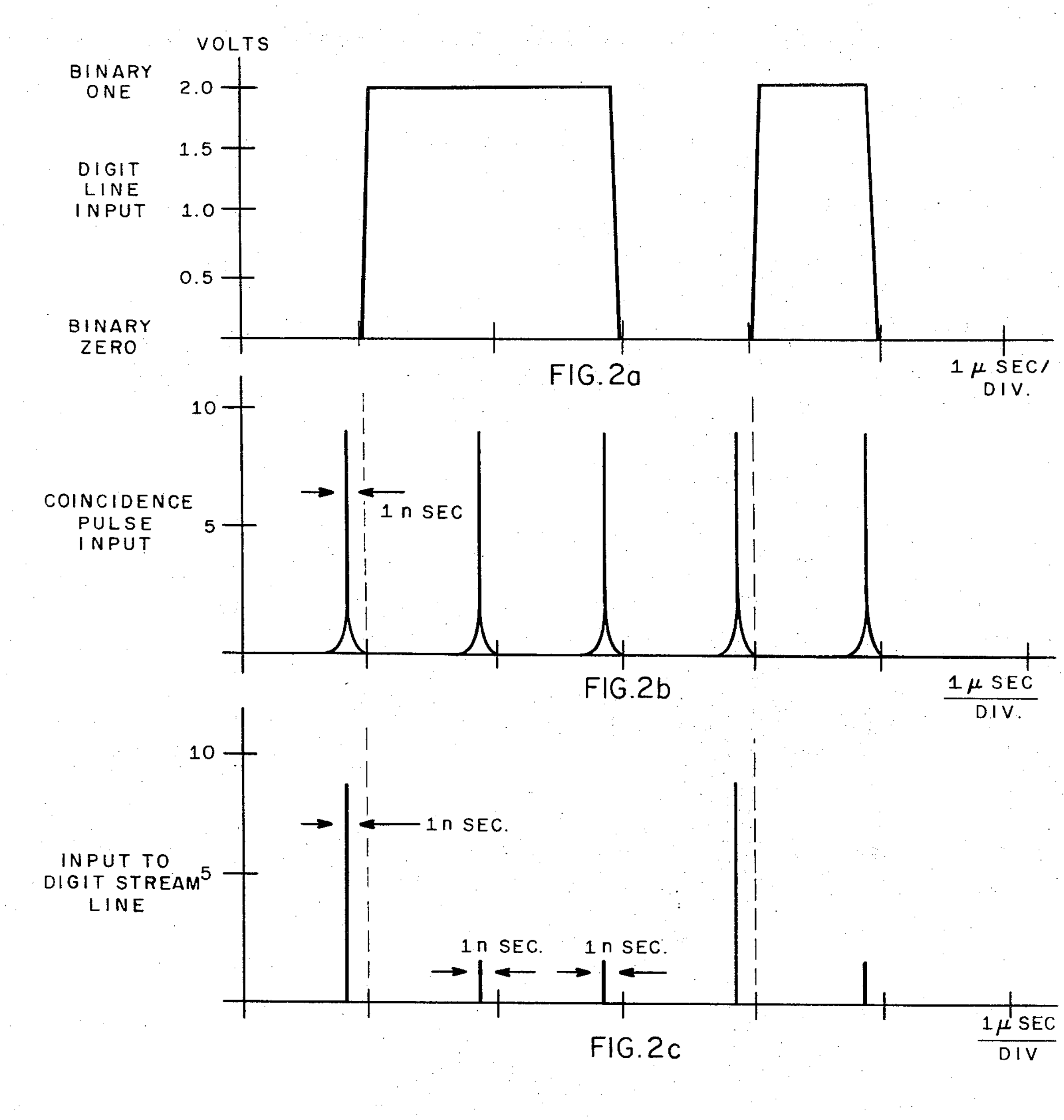
FIGS. 2*a*, 2*b* and 2*c* are a pulse timing diagrams illustrating the timing of a typical synthesizing gate of the multiplexing portion of FIG. 1.

Referring for the moment to FIG. 2a, the pulse waveforms associated with a typical one of the gates 13 are illustrated. FIG. 2a depicts a typical succession of digit values for a particular bit position of the data words applied to the multiplexing portion 11. FIG. 2b depicts the coincidence pulse train provided by the pulse generator 50, one pulse being provided for each word to be transmitted. FIG. 2c depicts the pulses coupled to the digit stream line 31 by a typical one of the gates 13 in response to the coincidence pulses and the digits of the data words being applied to its inputs. It is appreciated that in the instrumentation of the invention described herein, a pulse is coupled to the digit stream line 31 upon time coincidence of a coincidence pulse and a binary ZERO digit and no-pulse is coupled to the digit stream line upon time coincidence of a coincidence pulse and a binary ONE digit as hereinabove described.

Referring again to FIG. 1, consider the digits of a data word being applied to the respective inputs of the gates 13 and a coincidence pulse traveling past all of the gates 13 causing a corresponding serial digit stream to be applied to the digit stream line 31. The coincidence pulse traveling in the direction of the arrows traverses the coincidence pulse line 30 to the demultiplexing portion 12 and then past the inputs of the gates 32 to the termination 52. At the same time, the digit stream travels along the digit stream line 31 in the direction of the arrows, past the corresponding inputs to the gates 32 and then to the termination 54. As previously described, the lengths of the two transmission lines 30 and 31 are chosen such that the coincidence pulse arrives at a particular one of the gates 32 at the same time that the output pulse from the corresponding one of the gates 13 arrives thereat. For example, a coincidence pulse triggers the gate 14 to provide a pulse or no-pulse to the digit stream line 31 in accordance with the input digit. The coincidence pulse and the output pulse from the gate 14 travel in the direction of the arrows along the respective transmission lines 30 and 31 arriving in time coincidence at the inputs to the gate 33. If the input digit to the gate 14 was a binary ZERO, a pulse is coupled to the digit stream line and if the input digit to the gate 14 was a binary ONE, no-pulse is coupled to the digit stream line. The arrival of a pulse on the digit stream line at the gate 33 in time coincidence with the coincidence pulse on the line 30 causes the gate 33 to provide a signal representative of binary ZERO on its output 37. If, however, the coincidence pulse on the line 30 arrives at the gate 33 in time coincidence with no-pulse on the line 31, a signal representative of binary ONE is applied to the output 37. Thus, it is appreciated that the gates 32 provide parallel signals at the outputs thereof representative of the parallel digits applied to the inputs of the gates 13, respectively.

It will be appreciated that because of the exceedingly high-speed operation required of the gates 13 and 32, avalanche transistor gating circuits are utilized for the instrumentation thereof. For example, each of the gates 13 must produce nanosecond wide pulses at megahertz rates in response to the nanosecond wide coincidence pulses provided at megahertz rates. Each of the gates 32 must be capable of switching from sensitivity to insensitivity and back to sensitivity in 2 nanoseconds, in the present embodiment, since this is the time separation between the digit pulses traveling along the digit stream line. Each of the gates 32 must be capable of detecting time coincidence between the nanosecond wide coincidence pulses and digit pulses, providing an output in accordance therewith. Circuits suitable for instrumenting the gates 13 and 32 may generally be of the type disclosed in copending U.S. Pat. application Ser. No. 178,993 filed Sept. 9, 1971, entitled "A Circuit For Detecting Coincidence Between Low Energy Short Pulse Signals", by Ellis E. Eves II and assigned to the assignee of the present invention. It will be appreciated that a wide variety of circuits may be utilized in instrumenting the gates of the multiplexing-demultiplexing system of the present invention. Circuits found particularly suitable for instrumenting the synthesizing gates 13 and the reconstitution gates 32 are illustrated in FIGS. 3 and 4, respectively.

Figure 3:
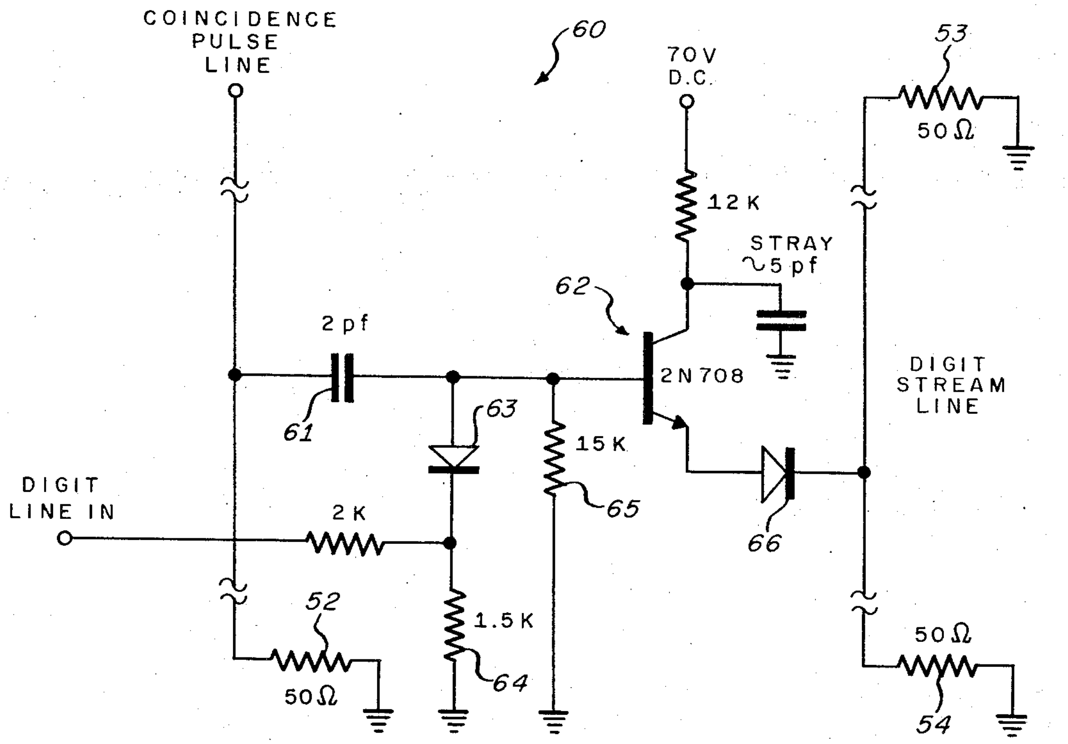
FIG. 3 is a schematic wiring diagram of a synthesizing gate utilized in the multiplexing portion of FIG. 1.
Figure 4:
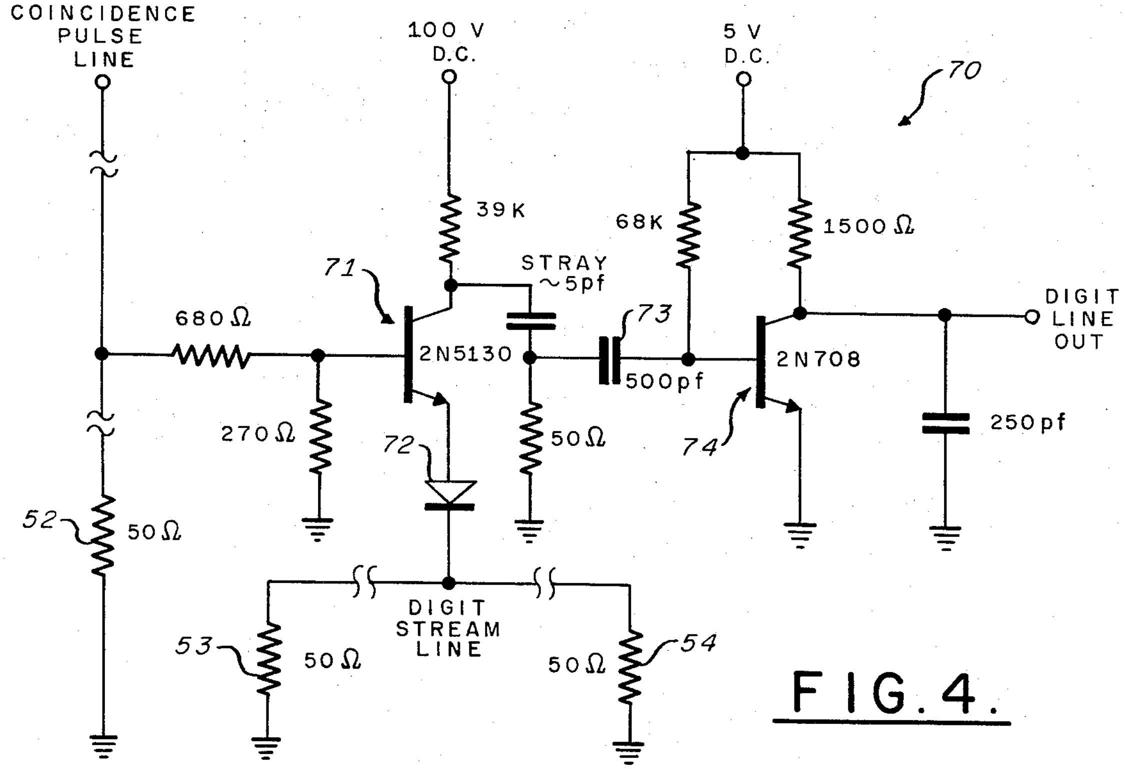
FIG. 4 is a schematic wiring diagram of a reconstitution gate utilized in the demultiplexing portion of FIG. 1.

Referring now to FIG. 3, a circuit 60 suitable for instrumenting each of the synthesizing gates 13 of FIG. 1 is illustrated. The coincidence pulse line is coupled via any suitable microwave coupling element (not shown) through a capacitor 61 to the base of an avalanche transistor 62. The base of the transistor 62 is connected to ground via a serially connected diode 63 and a resistor 64. The diode 63 should be of a fast-switching variety such as a conventional hot-carrier diode. The base of the transistor 62 is also connected to ground through a resistor 65 in parallel with the elements 63 and 64. The resistor 65 is selected to have a significantly higher resistance value than the resistor 64.

The emitter of the transistor 62 is coupled to the digit stream line via a diode 66 which should also be of a fast-switching variety such as a hot-carrier diode.

In operation, with ground potential applied to the input digit line, which potential may be representative of binary ZERO, the diode 63 is forward-biased connecting the base of the transistor 62 to ground through a low resistance path. This low base resistance renders the transistor 62 sensitive to breakdown in the presence of narrow positive coincidence pulses coupled to the base thereof. Thus, with a binary ZERO potential applied to the input digit line, a coincidence pulse triggers the transistor 62 into breakdown causing the collector potential to drop toward ground. The stray collector capacitance of the transistor 62 is sufficient to generate a pulse of several volts and of width on the order of nanoseconds at the emitter thereof which is diode-coupled to the digit stream line as required.

When, however, a positive potential is applied to the input digit line, which potential may be representative of binary ONE, the diode 63 is reversed biased thus rendering effective the high resistance base path to ground through the resistor 65. With a high base resistance, the operating characteristic of the transistor 62 is altered so as to render the circuit insensitive to breakdown in the presence of coincidence pulses. Thus, with a binary ONE potential applied to the input digit line, no-pulse is coupled to the digit stream line when the coincidence pulse occurs as required.

It is appreciated in the described embodiment that a polarity inversion occurs in converting the parallel input digits to the serial digit stream. A positive binary ONE potential on an input digit line is converted by the circuit 60 into no-pulse on the digit stream line whereas a binary ZERO ground potential is converted to a positive pulse on the digit stream line.

Referring now to FIG. 4, a circuit 70 suitable for instrumenting each of the reconstitution gates 32 of FIG. 1 is illustrated. The coincidence pulse line and the digit stream line of FIG. 1 provide the inputs to the circuit 70. The coincidence pulse line is coupled to the base of an avalanche transistor 71 and the digit stream line is coupled to the emitter of the transistor 71 via a diode 72. The diode 72 should be of a fast-switching variety such as a hot-carrier diode. The collector output of the transistor 71 is coupled via a capacitor 73 to the base of an avalanche transistor 74. The collector output of the transistor 74 provides the digit line output of the associated reconstitution gate (FIG. 1).

The transistor 71 is biased so that when the emitter thereof is essentially at ground potential, the transistor 71 is rendered sensitive to breakdown in the presence of a pulse on the coincidence pulse line. The transistor 74 is biased to be normally conducting in the absence of a pulse at its base.

In operation, consider that no-pulse exists on the digit stream line when the coincidence pulse arrives at the base of the transistor 71. It is appreciated that the no-pulse condition corresponds to a positive binary ONE potential on the corresponding input digit line of FIG. 3, as previously described. Under this condition, transistor 71 breaks down providing a negative-going pulse at the collector thereof in a manner similar to that described in said Ser. No. 178,993. The negative-going pulse is coupled to the base of the transistor 74 through the capacitor 73 thereby turning off the normally conducting transistor 74. The potential at the collector of the transistor 74 accordingly rises to a positive potential thereby providing a positive binary ONE signal on the digit output line as required.

When, however, a binary ZERO is transmitted, a narrow positive pulse appears on the digit stream line in time coincidence with a narrow positive pulse on the coincidence pulse line. The positive pulse on the digit stream line back biases the diode 72 increasing the potential at the emitter of the transistor 71. Under this condition, the coincidence pulse at the base of the transistor 71 is unable to turn the transistor 71 on. Thus, the transistor 74 remains conductive maintaining the collector thereof at nearly ground potential. Thus, the binary ZERO ground potential is applied to the digit output line as required.

It will be appreciated from the foregoing that the reconstitution gate of FIG. 4 is capable of detecting coincidence between the coincidence pulse and a space or a pulse on the digit stream line to within a resolution of 1 nanosecond. The transistor 74 of the circuit 70 amplifies the pulse energy to provide a digit line output pulse suitable for driving conventional digital circuitry. The input admittance of the circuit 70 is insignificant compared to the characteristic impedance of the transmission lines to which it is coupled so that the sequences of gates 32 (FIG. 1) do not load down the transmission lines.

Referring again to FIG. 1, the embodiment of the invention illustrated therein was described in terms of utilizing a coincidence pulse line 30 that is longer than the digit stream line 31 in order to achieve synchronization between the pulse traveling therealong. It will be appreciated that synchronization may also be achieved by utilizing transmission lines 30 and 31 of equal length by interchanging the 0.5 nanosecond transmission line with the 1.5 nanosecond transmission line in either the multiplexing portion 11 or the demultiplexing portion 12 of the system. For example, the delay elements 44 and 46 may be interchanged with respect to each other and the remaining delay elements of the sequences of elements 43 and 45 may similarly be interchanged. In this embodiment, the coincident pulse line 30 need not be longer than the digit stream line 31.

The above-described embodiment of FIG. 1 was illustrated having delay elements of 0.5 nanoseconds and 1.5 nanoseconds. It will be appreciated that these delay values are arbitrary, other delay values being possible within the limitation that the pulses on the digit stream line should not overlap. In the illustrated embodiment, the constructive addition of the 0.5 nanosecond delays and the 1.5 nanosecond delays results in a 2 nanosecond separation between the pulses on the digit stream line. This constructive addition of delays permits the use of smaller delay devices than in prior art configurations.

It will be appreciated that the use of unequal delay elements for the coincident pulse line and the digit stream line results in the elimination of interaction caused by the piling up of pulses flowing in the undesired direction in the multiplexing portion 11 of the system. Without this feature, the accumulation of several pulses from the first few synthesizing gates would inhibit the firing of subsequent gates.

It will also be appreciated that although the present invention was described in terms of utilizing transmission lines for the coincidence pulse line 30 and the digit stream line 31, it will be readily apparent to a practitioner in the art that any information conveying means may be utilized to couple the multiplexing portion 11 with the demultiplexing portion 12. For example, conventional radio or laser beam links may be utilized for this purpose.

It will further be appreciated from the foregoing that the coincidence pulse that sequentially enables the multiplexing gates 13 is transmitted by the line 30 to sequentially enable the demultiplexing gates 32 in time coincidence with the data stream on the line 31 as described above. Alternatively, a pulse derived from and time related to the coincidence pulse may also be utilized for this purpose. These arrangements provide advantages over prior art configurations since in the prior art configurations the pulse that sequentially enables the multiplexing gates is not transmitted to sequentially enable the demultiplexing gates. Thus in the prior art, complex synchronizing equipment must be utilized in the demultiplexing portion of the system to provide synchronous operation with respect to the incoming data. It is appreciated that the present invention obviates the need for such synchronizing equipment.

It will be additionally appreciated from the foregoing that since the present invention converts N parallel lines of digital data to a single serial line and reconstitutes the digit stream into N parallel lines at a distant terminal, the invention is effective in reducing the number of digital signal cables required between distant locations in environments where space and weight considerations are important. The invention is therefore applicable in aircraft, spacecraft and underseacraft, or where a large number of interconnecting cables may cause undesirable confusion such as in large digital computer systems. In order to employ the invention in connecting distant terminals, a strip microwave transmission line may be utilized to interconnect the gates of each of the two portions 11 and 12 of the system and flexible coaxial microwave transmission line to connect the two portions to each other with appropriate transitions therebetween.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A time division multiplexing-demultiplexing system for transmitting parallel digital data words comprising a plurality of first gating means each having first and second inputs and an output for providing a pulse at said output upon time coincidence of a pulse at said first input and a signal representative of a predetermined value of a digit of said data words at said second input, a serially connected sequence of first delay means coupling said first inputs of adjacent first gating means to each other, respectively, said second inputs of said first gating means being adapted to receive the digits of said data words, respectively, a serially connected sequence of second delay means coupling said outputs of adjacent first gating means to each other, respectively, a plurality of second gating means each having third and fourth inputs and an output for providing a pulse at said output thereof upon time coincidence of pulses at said third and fourth inputs, respectively, a serially connected sequence of third delay means coupling said third inputs of adjacent second gating means to each other, respectively, a serially connected sequence of fourth delay means coupling said fourth inputs of adjacent second gating means to each other, respectively, a source of coincidence pulses coupled to one end of said sequence of first delay means for applying coincidence pulses thereto in time coincidence with said data words, respectively, first transmission line means coupling the other end of said sequence of first delay means to said sequence of third delay means, and second transmission line means coupling said sequence of second delay means to said sequence of fourth delay means, said coincidence pulses sequentially traveling along said sequence of first delay means, said first transmission line means and said sequence of third delay means, whereby pulses representative of said digits of said data words applied respectively to said first inputs are serially applied via said second transmission line means to said sequence of fourth delay means wherein time coincidence with said coincidence pulses provides said digits of said data words at said outputs of said second gating means, respectively.

2. The system of claim 1 in which each said first and third delay means comprises a length of transmission line having a predetermined propagation delay.

3. The system of claim 2 in which each said second and fourth delay means comprises a length of transmission line having a propagation delay different from said predetermined propagation delay.

4. The system of claim 1 further including means for terminating said sequence of third delay means in a non-reflective termination.

5. The system of claim 1 further including means for terminating said sequences of second and fourth delay means in non-reflective terminations, respectively.

6. The system of claim 1 in which each said first and second gating means comprises an avalanche transistor gate.

7. The system of claim 1 in which said sequences of first and third delay means are coupled to each other via said first transmission line means and said sequences of second and fourth delay means are coupled to each other via said second transmission line means in such a manner that said coincidence pulses traveling through said sequences of first and third delay means travel in a direction opposite to said pulses representative of said digits of said data words traveling through said sequences of second and fourth delay means.

8. A time division multiplexing-demultiplexing system having a multiplexing portion and a demutiplexing pottion for transmitting parallel digital data words therebetween comprising a plurality of first gating means each having first and second inputs and an output for providing a pulse at said output upon time coincidence of a pulse at said first input and a signal representative of a predetermined value of a digit of said data words at said second input, a serially connected sequence of first delay means coupling said first inputs of adjacent first gating means to each other, respectively, said second inputs of said first gating means being adapted to receive the digits of said data words, respectively, a serially connected sequence of second delay means coupling said outputs of adjacent first gating means to each other, respectively, a source of coincidence pulses coupled to one end of said sequence of first delay means for applying coincidence pulses thereto in time coincidence with said data words, respectively, a plurality of second gating means each having third and fourth inputs and an outut for providing a pulse at said output thereof upon time coincidence of pulses at said third and fourth inputs, respectively, a serially connected sequence of third delay means coupling said third inputs of adjacent second gating means to each other, respectively, a serially connected sequence of fourth delay means coupling said fourth inputs of adjacent second gating means to each other, respectively, and transmission means coupling said multiplexing portion with said demultiplexing portion for transmitting said coincidence pulses to said sequence of third delay means and for coupling said sequence of second delay means to said sequence of fourth delay means, said coincidence pulses traveling along said sequence of first delay means and via said transmission means to said sequence of third delay means, whereby pulses representative of said digits of said data words applied respectively to said first inputs are serially applied via said transmission means to said sequence of fourth delay means wherein time coincidence with said coincidence pulses provides said digits of said data words at said outputs of said second gating means, respectively.

9. The system of claim 8 in which said transmission means includes at least one transmission line.

* * * * *